(12) United States Patent
Speller

(10) Patent No.: US 9,012,855 B2
(45) Date of Patent: Apr. 21, 2015

(54) RADIATION DETECTOR

(75) Inventor: Robert Speller, Cheddington (GB)

(73) Assignee: UCL Business PLC, London (GB)

( * ) Notice: Subject to any disclaimer, the term of this patent is extended or adjusted under 35 U.S.C. 154(b) by 0 days.

(21) Appl. No.: 14/240,795

(22) PCT Filed: Aug. 30, 2012

(86) PCT No.: PCT/GB2012/052117
§ 371 (c)(1),
(2), (4) Date: Apr. 8, 2014

(87) PCT Pub. No.: WO2013/030570
PCT Pub. Date: Mar. 7, 2013

(65) Prior Publication Data
US 2014/0224994 A1      Aug. 14, 2014

(30) Foreign Application Priority Data
Aug. 30, 2011    (GB) .................................. 1114866.5

(51) Int. Cl.
| G01T 1/20 | (2006.01) |
| G01T 1/29 | (2006.01) |
| G01T 7/00 | (2006.01) |
| G01T 1/202 | (2006.01) |

(52) U.S. Cl.
CPC ............ *G01T 1/2006* (2013.01); *G01T 1/2907* (2013.01); *G01T 7/00* (2013.01); *G01T 1/2002* (2013.01); *G01T 1/2023* (2013.01)

(58) Field of Classification Search
CPC ..................................................... G01T 1/2006
USPC ..................................... 250/362, 368, 361 R
See application file for complete search history.

(56) References Cited

U.S. PATENT DOCUMENTS

| 4,874,951 A | 10/1989 | Gold et al. |
| 4,980,552 A * | 12/1990 | Cho et al. ................. 250/363.03 |
| 5,929,446 A | 7/1999 | Plummer et al. |
| 2010/0163744 A1 | 7/2010 | Lacy |

FOREIGN PATENT DOCUMENTS

| FR | 2925702 | 6/2009 |
| JP | 54 151884 | 11/1979 |
| JP | 11153670 | 6/1999 |
| KR | 10-2010-0122596 | 11/2010 |
| WO | WO 95/30159 | 11/1995 |

* cited by examiner

*Primary Examiner* — David Porta
*Assistant Examiner* — Faye Boosalis
(74) *Attorney, Agent, or Firm* — Leason Ellis LLP

(57) ABSTRACT

A radiation detector includes a scintillator crystal (2) in the form of a slab mounted to be rotated by a drive (4) in a housing (8). A photon detector (6) detects photons emitted by the crystal (2). The crystal (2) is rotated to a number of measurement angles and the radiation emitted by a radiation source determined by counting the photons detected by the photon detector. This is used to determine the direction towards the radiation source.

14 Claims, 6 Drawing Sheets

RADIATION DETECTOR

CROSS REFERENCE TO RELATED APPLICATIONS

The present application is a U.S. National Phase of International Patent Application PCT/GB2012/052117, filed Aug. 30, 2012, which claims priority to Great Britain Patent Application No. GB 1114866.5, filed Aug. 30, 2011, each of which is incorporated herein by reference in its entirety.

FIELD OF INVENTION

The invention relates to apparatus for detecting radiation, including for example gamma radiation, and a method of detecting radiation.

RELATED ART

The need for apparatus to detect radiation such as gamma radiation is present in a number of technical fields, including for example medical isotope imaging and screening apparatus for example for security applications.

Medical isotope imaging is one such application. There are two common methods for detecting radiation in this application, either a scintillation camera or alternatively Positron emission tomography (PET). In either case the patient is given a radiopharmaceutical, which will interact with a specified organ in the body. The position of this radiopharmaceutical can then be deduced by detecting gamma radiation it emits. From this physiological information can be gathered.

In a typical scintillation camera, a lead collimator selects the direction of the gamma rays that can be detected such that only gamma rays travelling approximately perpendicular to a scintillator can be detected. The light emitted by the scintillator is then detected by a photomultiplier tube (PMT) array and the relative difference in intensity of signal from the different PMTs allows the point where the gamma ray struck the crystal to be determined. Due to the known nature of the collimation the location of the source within the patient can be deduced.

Variations on the collimator include a pinhole collimator for imaging small organs such as the thyroid, (indeed this is how the originally proposed scintillator camera was collimated), and diverging/converging collimators for imaging areas larger or smaller then the crystal respectively. Whilst the scintillation camera is good for radioisotope imagining, it has its limitations. The collimator, being made from lead, is rather heavy and makes the device large and cumbersome. As a result it is not portable and is therefore confined to a room within a hospital. It is therefore not possible to image patients who are too ill to be taken to the scanner or to use the scanner in the operating theatre.

If portability is not an issue it is possible to produce 3D tomographic images using two or three scintillation cameras. The camera rotates around the patient and take a series of images which can either be back projected or processed via iterative methods to produce a slice through the patient in a process called single positron emission tomography (SPECT). This can be combined with X-ray computed tomography, CT, so that anatomical data can be provided for more accurate location of the radioisotope source.

Whereas scintillation cameras measures single photon emission and use collimation to determine the direction of the incident gamma ray, PET relies on the antiparallel emission of two 551 KeV gamma rays as a positron-electron annihilation occurs. 3D slices can be produced with modern 3D PET scanners able to achieve resolutions in the range of 4.5 mm. PET scanners lack portability.

Another application for radiation detection is for security. For example radiation portal monitors (RPMs) are used to screen cargo and personal. These often rely on an increase in gamma count. Unfortunately this approach can lead to a high level of false positives, as many legitimate sources, such as clay tiles, may cause a rise in count rate. In January 2004 a patient who had undergone radioactive iodine therapy 6 weeks previously activated a radiation alarm at Orlando airport and was subsequently detained and strip-searched. Whilst this is an extreme example it does highlight the importance of accuracy beyond that of causing inconvenience and cost to the operator of the device.

Whilst it is possible to use energy window algorithms on RPMs to reduce the number of false positives this type of detector requires that each item of cargo be taken through the detector.

SUMMARY OF INVENTION

According to a first aspect of the invention there is provided a radiation detector according to claim 1.

In another aspect, there is provided a method of operation of a radiation detector according to claim 11.

By using a slab-type scintillator crystal and rotating the crystal to a number of angles, the radiation intensity measured by the radiation detector at the different angles can be used to determine the direction to the radiation source being detected.

BRIEF DESCRIPTION OF DRAWINGS

Embodiments of the invention will now be described, purely by way of example, with reference to the accompanying drawings in which.

The drawings are schematic and not to scale.

DETAILED DESCRIPTION

The radiation detector is based upon the principle that when an object, which exhibits slab geometry, is rotated about a central axis the area exposed to radiation coming from a particular direction changes. Thus, by rotating a scintillator, the amount of radiation captured by the scintillator varies with the angle of rotation which allows the direction to the radiation to be determined.

Figure 1:
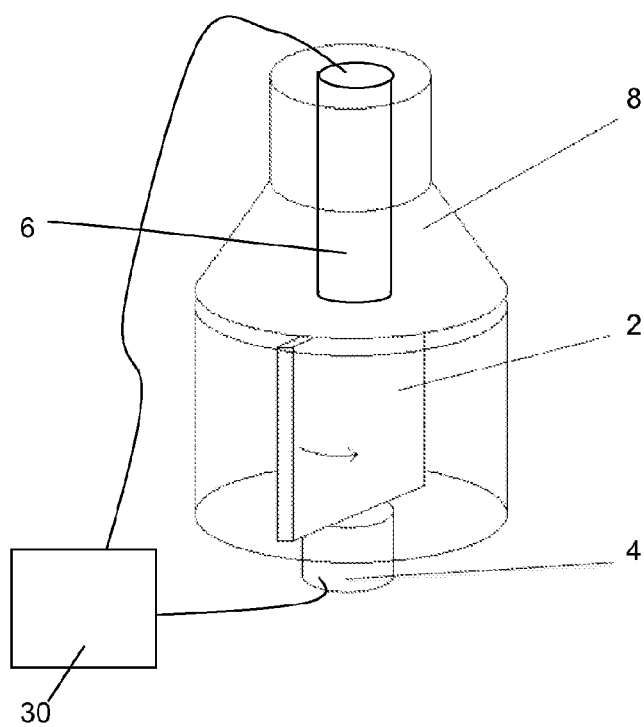
FIG. 1 shows a schematic drawing of an embodiment of the invention.
Figure 2:
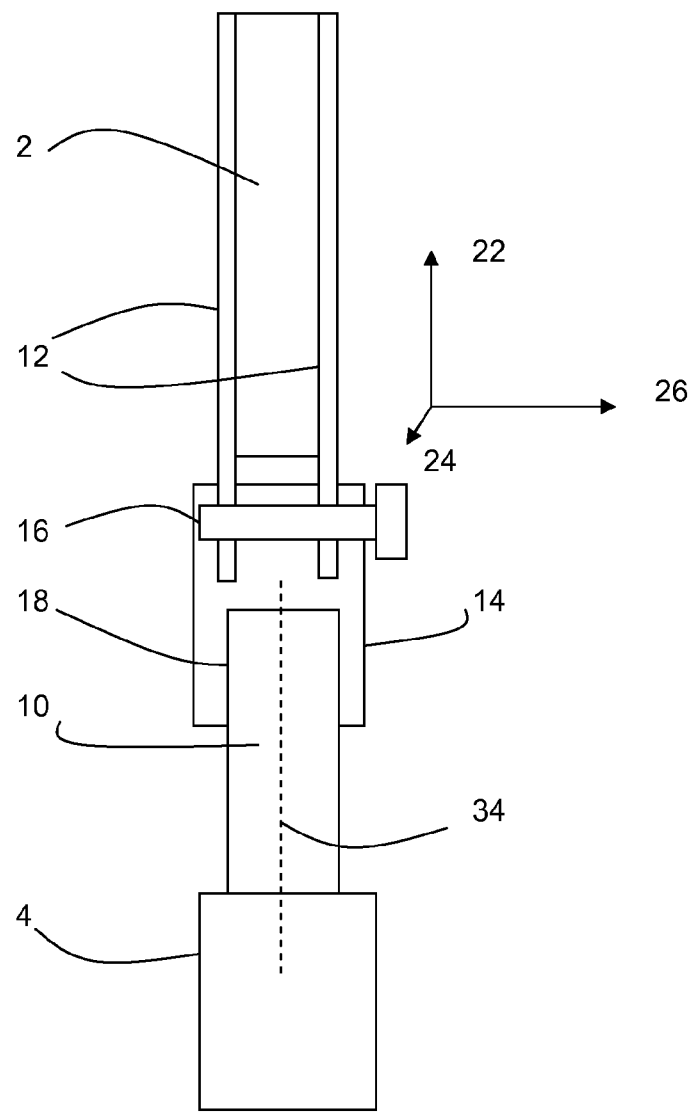
FIG. 2 shows a schematic drawing of part of the embodiment of FIG. 1.

Referring to FIGS. 1 and 2, a radiation detector includes a radiation sensor which in the embodiment is a scintillator crystal 2 having a slab geometry with a thickness direction 26, the crystal extending in lateral 24 and longitudinal 22 directions perpendicular to the thickness direction 26, and a drive means in the form of a motor 4 arranged to rotate the scintillator crystal 2 about a rotation axis 34. In the embodiment, the rotation axis 34 is along the longitudinal direction of the scintillator crystal but this is not always necessary.

A photomultiplier tube 6 (PMT) is used to detect the light output of the scintillator. The device is in a housing 8 that does not attenuate the incoming radiation to a great extent, but that is completely light tight so that ambient light is not detected. The housing is shown transparent in FIG. 1 so that the internal components can be seen.

The radiation detector is controlled by a controller 30 which controls the drive means and which processes the data. The controller 30 may be in the form of hardware or indeed of software driving a computer and is shown schematically in FIG. 1.

The scintillator crystal 2 is mounted to the shaft 10 of the motor 4 by clamping the crystal 2 between two pieces of perspex 12 supported on clamp 14 (FIG. 2). The clamp 14 has screws 16 for holding the perspex and a shaft recess 18 for holding the shaft 10 of the motor. The coupler used was of the type known as an Oldham coupler. Other forms of mounting and coupling are also possible.

Note that the scintillator crystal 2 is shown in this embodiment mounted with the longitudinal direction 22 along the axis of rotation of the shaft 10 of the motor.

The scintillator crystal will tend to trap light emitted by total internal reflection and so the light emitted in response to gamma radiation will mostly be emitted from the edges. Typically about 80% of the light will be trapped inside the crystal and piped to the edges. The inside of the housing 8 is painted white to diffusely reflect the light onto the photomultiplier 6.

In one embodiment, the scintillator crystal is square, i.e. the longitudinal dimension matches the lateral dimension of the slab. This can assist in achieving, at least partly, the desirable condition that light emitted at all points within the crystal is more equally likely to leave the crystal.

Figure 3:
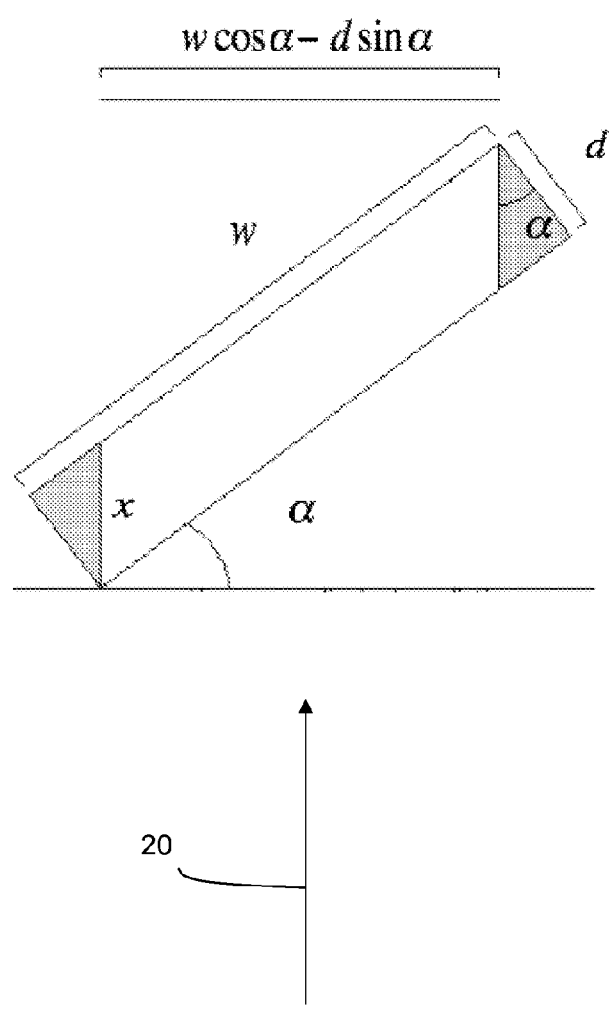
FIG. 3 shows a schematic drawing of the geometric arrangement.

Referring to FIG. 3, it is apparent that the effective area A of scintillator crystal exposed to radiation indicated by arrow 20 is given by:

$$A=(w \cos \alpha - d \sin \alpha) \cdot h$$

where w is the lateral width of the slab, d is the thickness of the slab, h is the longitudinal length of the slab and $\alpha$ is the angle of the slab to the nominal zero direction in which the slab is perpendicular to the direction of radiation.

In use, the controller 30 causes the motor 4 to rotate the scintillator crystal 2 to a plurality of measurement angles. At each measurement angle, radiation incident on the scintillator crystal 2 from a radiation source causes light to be emitted by the scintillator crystal 2 and detected by the radiation detector 6, the PMT. The radiation detected over a time interval is determined by counting the number of photomultiplier tube events. This gives a set of radiation intensities at corresponding measurement angles.

The controller 30 then uses this information to determine the minimum in the radiation intensities and the angle of the slab at which the minimum occurs corresponds to the radiation being incident on the edges of the slab, i.e. at the minimum angle the edge of the slab points towards the position of the radiation source.

Other features of the radiation against angle such as a maximum may be used. For the case of a simple slab and a single source, the use of the minimum gives better accuracy than the use of a maximum. Improved arrangements fit the measured response to a calculated curve of radiation intensity against angle and use the fit to determine the angle.

In the event of there being more than one radiation source or an extended source more complex processing of the measured data is required to determine the location or locations of the source. In particular, it is possible to fit the measured radiation intensity as a function of measurement angle to models of the intensity picked up from plural radiation sources of different intensity.

Measurement results will be presented using a specific embodiment which will now be described in more detail.

In the specific embodiment, an EMI 9531B photomultiplier tube 6 was used. This is a 11 venetian blind CsSb dynodes, S-11 cathode type tube of standard characteristics, outputting approximately 2000 A/Lm when run at 1750V. Of course, the skilled person will realise that alternative tubes can be used.

An ideal scintillator would have a high light output at a wavelength convenient for detection. The most commonly used scintillator for gamma-ray imaging applications is thalium doped sodium iodide (NaI:Th). This is due to its reasonably high density 3.7 g/cm$^3$ allowing rays of typical energy to be stopped in a relatively thin crystal along with a high light output of 38,000 photons/MeV, at a convenient wavelength of about 420 nm for an S-11 photocathode photomultiplier tube to detect. It also does not exhibit significant afterglow. Indeed NaI:Th is used by many texts as a benchmark for comparison when looking at scintillator performance. NaI:Th unfortunately is both fragile and highly hydroscopic so that when utilised in a gamma camera it must be encased in glass to ensure that it cannot react with water present in the atmosphere. Such a glass-encased NaI:Th is one possibility for the scintillator.

A less suitable alternative is an organic scintillator such as a Polyvinyl Toluene (PVT) based plastic scintillator. PVT alone is not useful as the wavelength of emission is approximately 350 nm, however upon addition of aromatic primary fluors, this can be increased to 400-500 nm whilst also achieving a 30% increase in brightness. Unfortunately PVT has a very low density of 1.03 g cm$^{-3}$ and low attenuation coefficient of 0.026 it is rather poor at stopping gamma rays of higher energy. Therefore, PVT is suitable for detecting lower energy gamma rays.

A further alternative is the use of a CsI scintillator. Such are available commercially doped with either sodium (CsI:Na) or thallium (CsI:Th) along with an array of co-dopes that exhibit desirable properties. Densities and attenuation coefficients are approximately the same for each—4.51 gcm$^{-3}$ and 2.2 cm$^{-1}$ at 60 KeV. CsI:Na emits 38,500 photons/MeV[19] of light with a wavelength of approximately 420 nm, it is however slightly Hygroscopic. CsI:Th has a higher light output of 52,000 photons/MeV at a less convenient wavelength of approximately 565 nm. However it is not hygroscopic and is available co-doped with Eu$^{2+}$ to suppress afterglow.

Although either option CsI would be suitable, the results below are obtained with CsI:Na since the wavelength of light produced better matches the PMT used.

Once the scintillator has emitted the pulses of light a photomultiplier tube detects them. In a photomultiplier tube photons strike the photocathode and are converted into photoelectrons. These photoelectrons are drawn along a cascade of dynodes up an inter-dynode potential gradient. The number of electrons grows in number at every step resulting in an overall gain of approximately 10$^6$. At the end of the dynode chain they strike an anode and causes a fluctuation in current. This fluctuation can then pass across a capacitor and a resister and be detected as a voltage.

Figure 4:
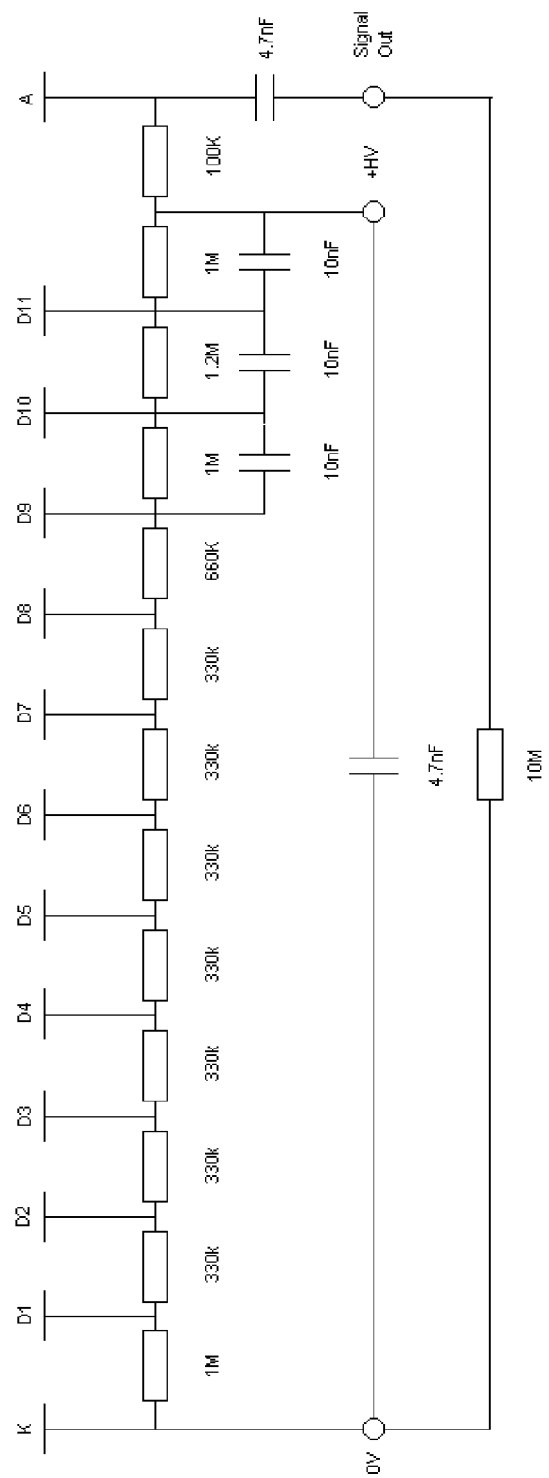
FIG. 4 shows a circuit arrangement used to drive a specific embodiment of the invention.

A gradient of voltages along the dynode chain is needed. A simple linear divider did not give good results and the divider adopted for the experiments is that shown in FIG. 4. Note that the resistor series is not linear, this is to decrease the space charge effect that can occur in PMTs. Alternatively, drive circuitry can be provided to generate separately each of the required voltages.

The motor 4 is a stepper motor since it is useful to be able to rotate the scintillator to known positions. Alternative motors may be used, for example coupled with a system for identifying the rotation position of the motor.

The housing used was PVC since it is relatively cheap and effective. At the thickness and wavelength of interest, PVC attenuates only 0.84% of the incoming gamma radiation, so PVC has good properties. Thus, in general, the housing has an attenuation of gamma rays of at most 1% at the wavelength peak of gamma rays emitted by an Am-241 source.

For many scintillator crystal aspect ratios, much of the light output by the scintillator is contained by total internal reflection and leaves the edges of the scintillator crystal. In order to couple the light to the PMT 6, the housing 8 is painted white inside as a diffuse reflector using conventional paint. Note that the housing may have a frustoconical form in the region of the photomultiplier tube, to assist in directing light from the scintillator to the PMT 6.

Figure 5:
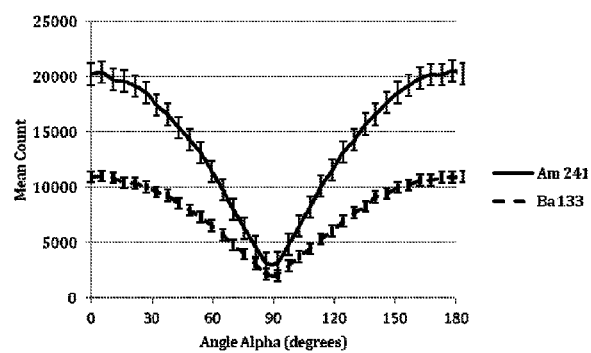
FIGS. 5 and 6 illustrate measurement results obtained using the embodiment.
Figure 6:
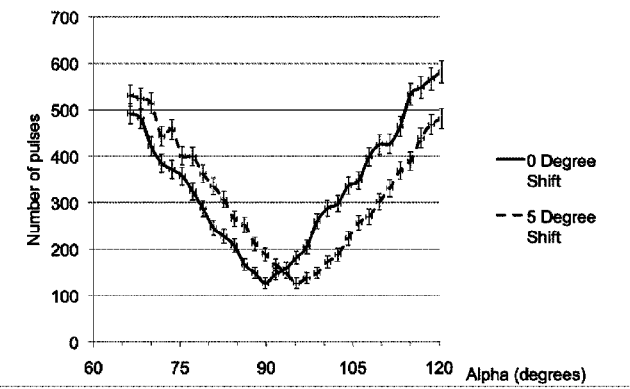

Experimental results were obtained with Am 241 and Ba-133 point sources as a source of gamma radiation, and shown in FIG. 5. The change in response as the scintillator is rotated is clearly visible. It is possible to locate the minimum to good accuracy as illustrated in FIG. 6. The minimum indicates the direction to the source.

As well as scintillator optimisation, it is desirable to maximise the efficiency of the device. This decreases the exposure times required and increases the difference between count numbers leading to both decreased scan times and increased resolution.

Figure 7:
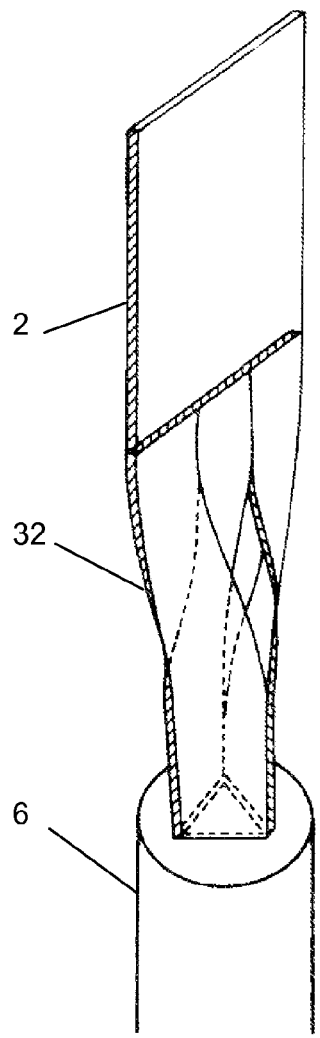
FIG. 7 is a schematic drawing of part of an alternate embodiment.

Accordingly, in an alternative embodiment, the PMT is coupled directly to the edge of the scintillator crystal. FIG. 7 illustrates how this may be done with a light guide 32. This coupling increases the efficiency of the light coupling and hence decreases necessary exposure times.

A further variation is to use a different PMT. For example, a PMT may be used that has a peak detection at a wavelength of approximately 565 nm. In this case CsI:Th may be used instead of CsI:Na. The advantages of this are that it increases the light yield from 38,500 to 65,000 photon per MeV. It is also possible to use CsI:Th co-doped with $Eu^{2+}$ which reduces afterglow leading to more reliable results.

Directionality may be further increased by covering one or more surfaces such as the lateral edges or faces of the slab with an absorbing material such as lead leaving the opposed edge or face without such absorbing material. The apparatus will then give a different response to absorbing radiation depending on whether the surface facing the radiation detector is an absorbing surface or not.

The apparatus of the invention may be of particular application not only in the medical field but also in the case of security systems. In particular, the apparatus may be mounted in a fixed location where it is desired to control radiation sources, and used to monitor the radiation sources around the fixed location. In this application, the apparatus may be operated slowly with long measurement times allowing the detector to detect radiation from sources at ranges of 10 m, 100 m or even more. In this way, the apparatus may be used to monitor an area. The directionality of the apparatus means that if a signal is detected the source of the signal can be identified.

Plural radiation detectors may also be used with perpendicular rotation axes to find the angle to the radiation source about more than one axis. Thus, if we consider the angle about a vertical axis to be a "longitude" and the angle about a horizontal axis to be a "latitude", two radiation detectors, one with the rotation axis horizontal and one with the rotation axis vertical, may be used to determine both the "latitude" and "longitude" of the radiation source. In other words, two detectors with perpendicular rotation axes may be used to find the direction to the radiation source in three dimensions, not just the direction on a two-dimensional plane.

In the case of fixed installations, a plurality of radiation detectors may be mounted at different positions in an area of interest in order to be able to fix the location of radiation sources by triangulation or indeed simply to extend the coverage by extending the area over which radiation can be detected.

Instead of a scintillator crystal and photomultiplier tube, a germanium gamma ray detector may be used. Such a detector is typically in the form of a flat semiconductor device. The germanium detector may be mounted on a rotary mounting in a similar way to the scintillator crystal.

The invention claimed is:

1. A radiation detector comprising:
a scintillator crystal;
a rotary mounting supporting the scintillator crystal allowing rotation of the scintillator crystal about a rotation axis;
a drive means arranged to rotate the scintillator crystal about the rotation axis to controllable angles;
a processing means arranged to cause the drive means to rotate the scintillation crystal to a plurality of measurement angles, to measure the response of the scintillation crystal at the plurality of angles, and to determine the direction of a radiation source from the measurements of photons at the plurality of measurement angles; and
a photon detector arranged to measure photons emitted by the scintillator crystal in response to radiation;
wherein the scintillator crystal is shaped to present a cross-section to radiation from a radiation source, the cross section varying that varies as a function of measurement angle as the scintillator crystal rotates about the rotation axis.

2. The radiation detector according to claim 1, wherein the scintillator crystal is in the form of a slab having a thickness direction, the scintillator crystal being mounted on the rotary mounting with the thickness direction substantially perpendicular to the rotation axis.

3. The radiation detector according to claim 1, further comprising a housing surrounding the scintillator crystal and photon detector, wherein the interior of the housing is reflective or white to reflect photons emitted by the scintillator crystal so that they can be detected by the photon detector.

4. The radiation detector according to claim 1, further comprising a light guide coupling the scintillator crystal to the photon detector.

5. The radiation detector according to claim 1, wherein the drive means is a stepper motor.

6. The radiation detector according to claim 1, wherein the scintillator crystal is of NaI:Th, CsI:Th or CsI:Na.

7. The radiation detector according to claim 1, wherein the thickness of the scintillator crystal is 1 mm to 5 mm and the lateral width and longitudinal length of the scintillator crystal are each 10 mm to 200 mm.

8. A radiation detector comprising:
a scintillator crystal;
a rotary mounting supporting the scintillator crystal allowing rotation of the scintillator crystal about a rotation axis;
a drive means arranged to rotate the scintillator crystal about the rotation axis to controllable angles; and a photon detector arranged to measure photons emitted by the scintillator crystal in response to radiation;

wherein the scintillator crystal is shaped to present a cross-section to radiation from a radiation source, the cross section varying as a function of measurement angle as the scintillator crystal rotates about the rotation axis; and the drive means is a drive motor having a shaft along the drive axis, the radiation detector further comprises two mounting sheets mounted on the rotary mounting which is mounted on the shaft, and the scintillator crystal is mounted between the two mounting sheets.

9. The radiation detector according to claim 1, wherein the photon detector is a photomultiplier tube.

10. A method of operation of a radiation detector to detect radiation from a radiation source, comprising:

rotating a scintillator crystal about a rotation axis to a plurality of measurement angles to present a cross-section to radiation from a radiation source that varies as a function of angle as the scintillator crystal rotates about the rotation axis;

measuring photons emitted by the scintillator crystal in response to radiation from the radiation source at the plurality of angles; and determining the direction of the radiation source from the measured response at the plurality of measurement angles.

11. The method according to claim 10, wherein the step of determining the direction of radiation of the radiation source identifies the radiation source from at least one minimum and/or maximum in the measured response at the plurality of measurement angles.

12. The method according to claim 10, wherein the radiation source is a medical gamma ray source.

13. The method according to claim 10, including mounting the radiation detector in a fixed location and operating the radiation detector to monitor radiation sources introduced into the vicinity of the radiation detector.

14. The method according to claim 10, wherein there are plural radiation sources, and wherein the step of determining the direction of the radiation source from the measured response at the plurality of measurement angles determines the direction of the plurality of radiation sources.

* * * * *